US008561678B2

(12) United States Patent
Richardson et al.

(10) Patent No.: US 8,561,678 B2
(45) Date of Patent: *Oct. 22, 2013

(54) HEAT EXCHANGER TANK AND RELATED APPARATUSES

(75) Inventors: David J. Richardson, Edinburg, PA (US); Brian Meier, Pittsburgh, PA (US)

(73) Assignee: Richardson Cooling Packages, LLC, New Castle, PA (US)

(*) Notice: Subject to any disclaimer, the term of this patent is extended or adjusted under 35 U.S.C. 154(b) by 832 days.

This patent is subject to a terminal disclaimer.

(21) Appl. No.: 12/779,946

(22) Filed: May 13, 2010

(65) Prior Publication Data

US 2011/0277958 A1    Nov. 17, 2011

(51) Int. Cl.
*F28F 9/02*    (2006.01)
(52) U.S. Cl.
USPC ................ 165/173; 165/67; 165/69
(58) Field of Classification Search
USPC ............................. 165/67, 69, 173
See application file for complete search history.

(56) References Cited

U.S. PATENT DOCUMENTS

| | | | |
|---|---|---|---|
| 3,121,467 A * | 2/1964 | Bryant | 165/69 |
| 3,833,054 A | 9/1974 | Gross et al. | |
| 3,982,587 A | 9/1976 | Tramontini | |
| 4,471,764 A | 9/1984 | Calvert et al. | |
| 4,619,313 A | 10/1986 | Rhodes et al. | |
| 4,770,234 A | 9/1988 | Hiraoka et al. | |
| 5,257,662 A | 11/1993 | Osborn | |
| 5,269,367 A | 12/1993 | Susa et al. | |
| 5,311,933 A | 5/1994 | Lee | |
| 5,390,733 A | 2/1995 | Young | |
| 5,441,100 A | 8/1995 | Ueda et al. | |
| 5,490,560 A | 2/1996 | Helms et al. | |
| 5,865,244 A | 2/1999 | Moser | |
| 5,975,197 A | 11/1999 | Kado | |
| 6,571,898 B2 * | 6/2003 | Guyomard | 165/69 |
| 6,874,570 B2 | 4/2005 | Horiuchi | |
| 6,896,044 B2 | 5/2005 | Kato | |
| 7,441,620 B2 * | 10/2008 | Riniker et al. | 165/69 |
| 7,640,966 B2 | 1/2010 | Maeda et al. | |

FOREIGN PATENT DOCUMENTS

| | | |
|---|---|---|
| DE | 1211501 B | 2/1966 |
| DE | 102004044873 A1 | 3/2006 |
| DE | 102007006235 A1 | 8/2008 |
| EP | 0668480 A1 | 8/1995 |
| GB | 537170 A | 6/1941 |

* cited by examiner

*Primary Examiner* — Leonard R Leo
(74) *Attorney, Agent, or Firm* — Spilman Thomas & Battle, PLLC

(57) ABSTRACT

A heat exchanger (such as a radiator) that provides for a consistent tank-to-header joint location. The tank generally includes at least two indentations and at least one isolator having a base at least partially disposed in one of the indentations and a coupler extending from the base for coupling the tank to at least one other component of the heat exchanger.

12 Claims, 11 Drawing Sheets

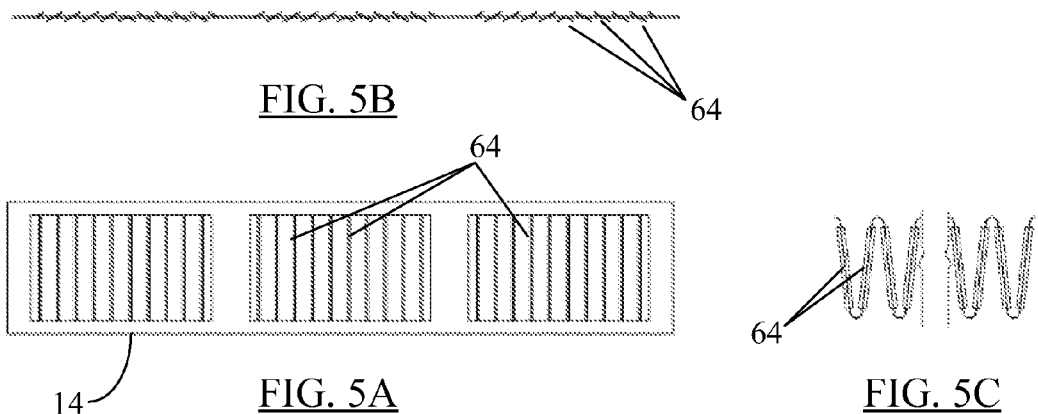
FIG. 5B
FIG. 5A
FIG. 5C
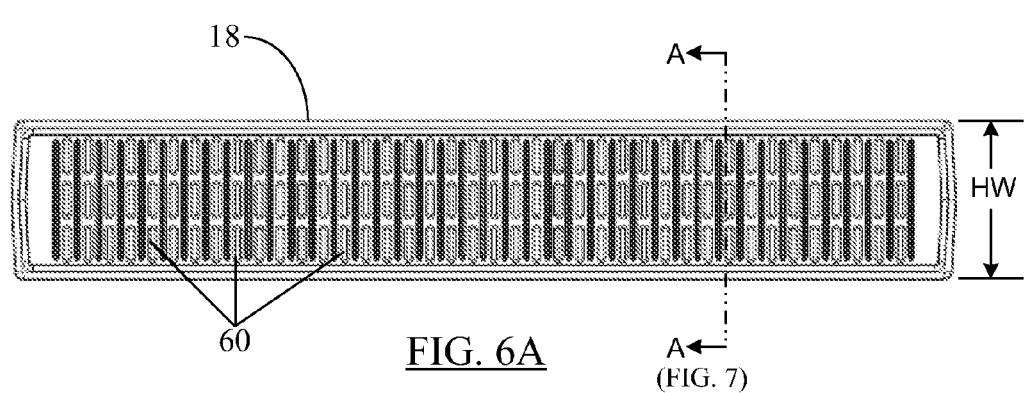
FIG. 6A
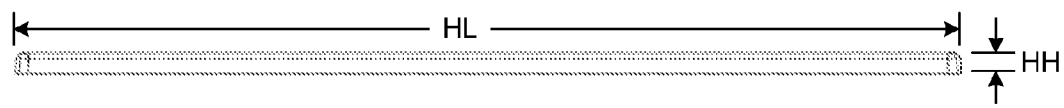
FIG. 6B
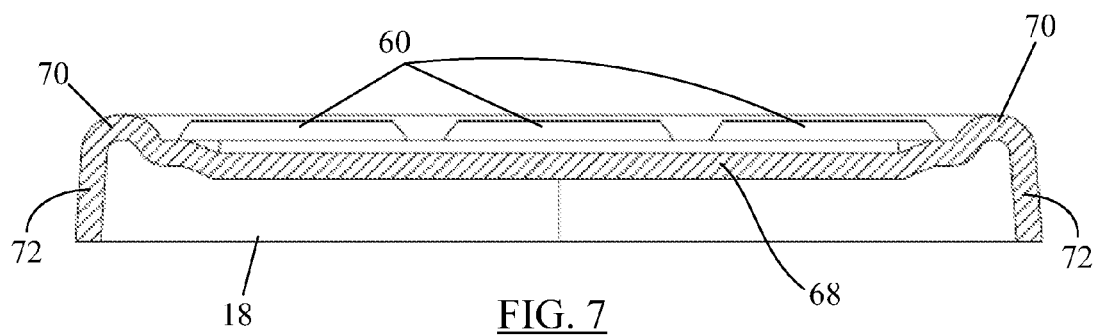
FIG. 7

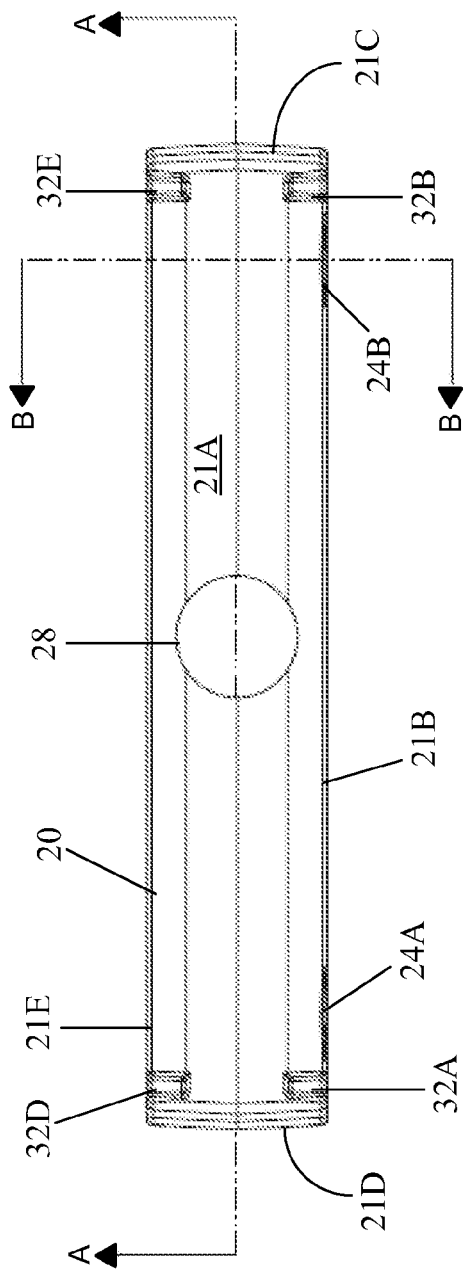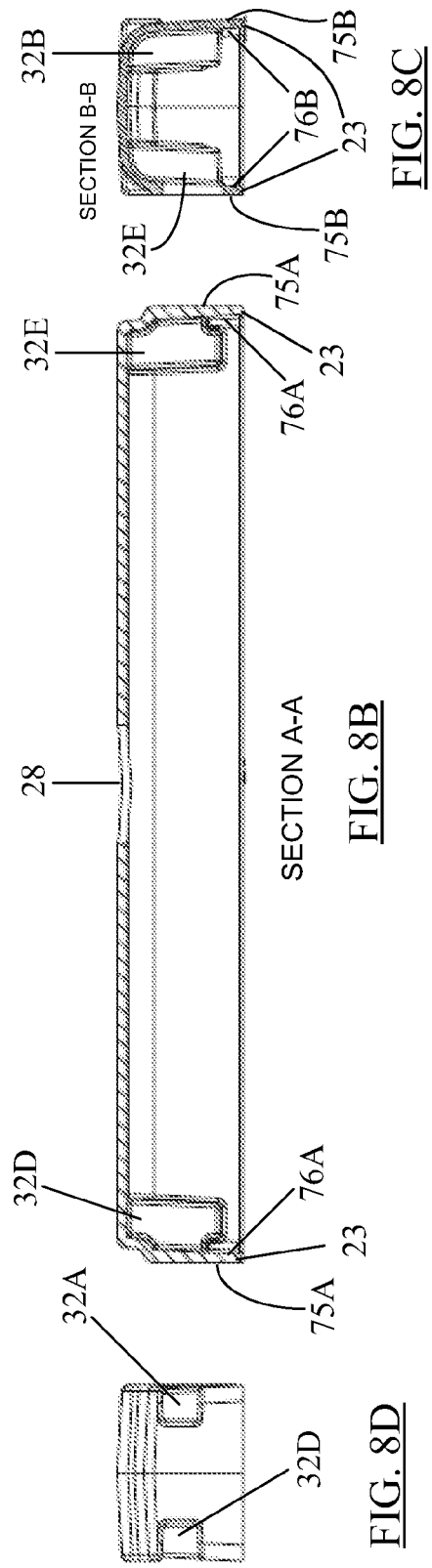

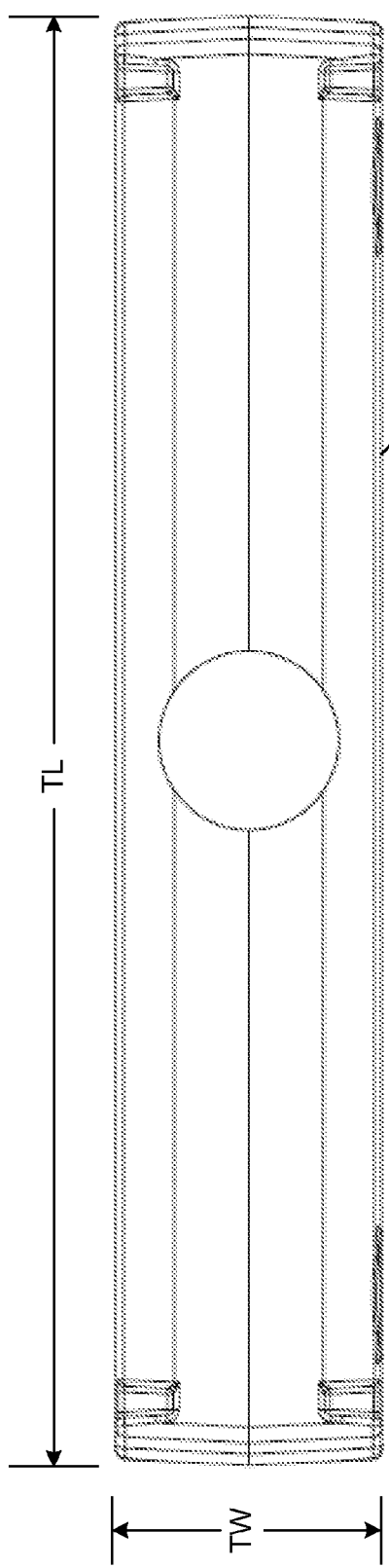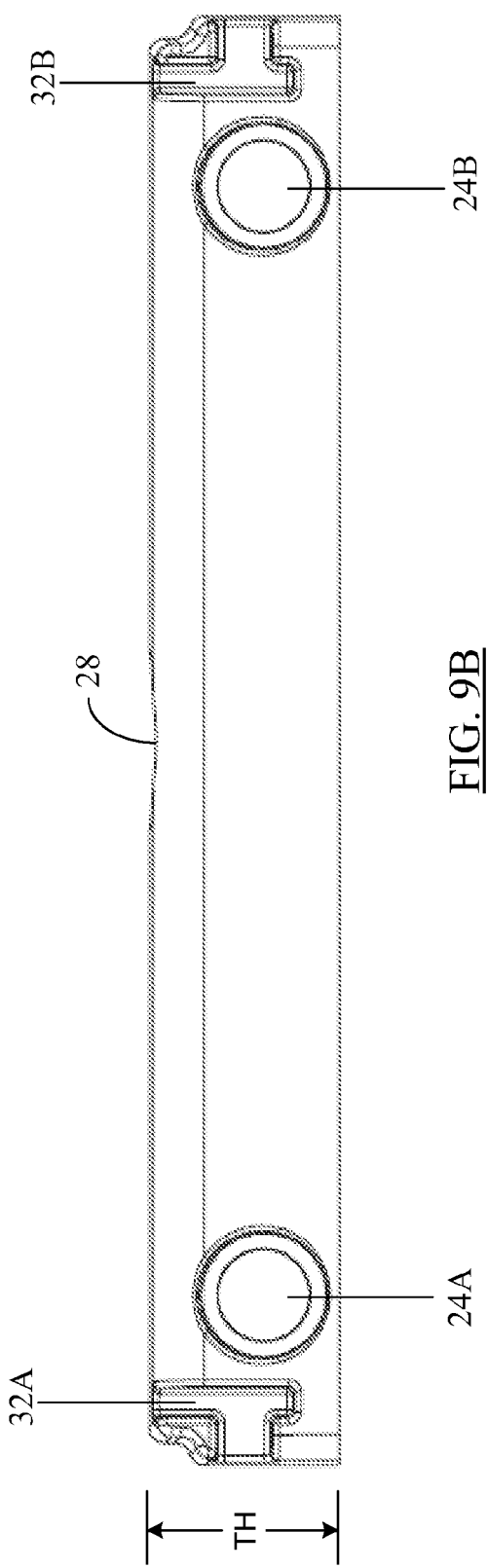

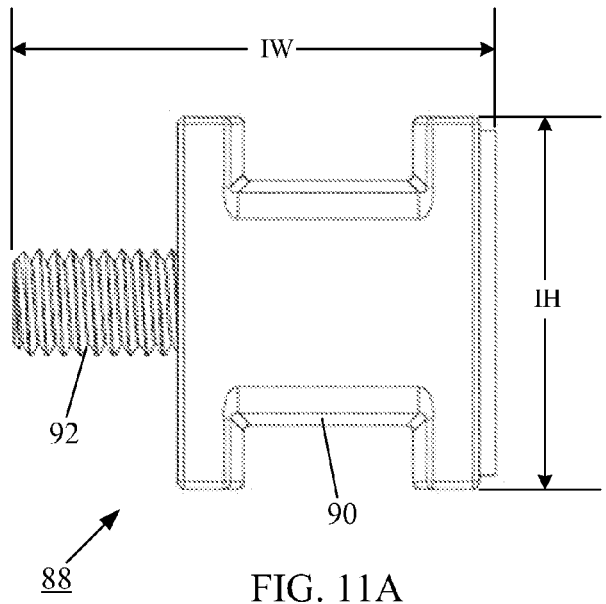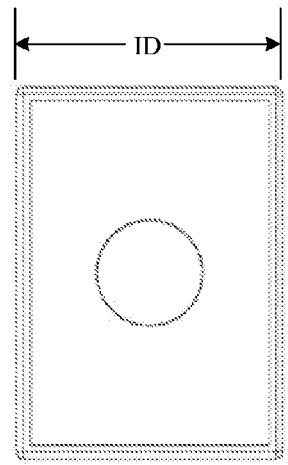
FIG. 11A  FIG. 11B
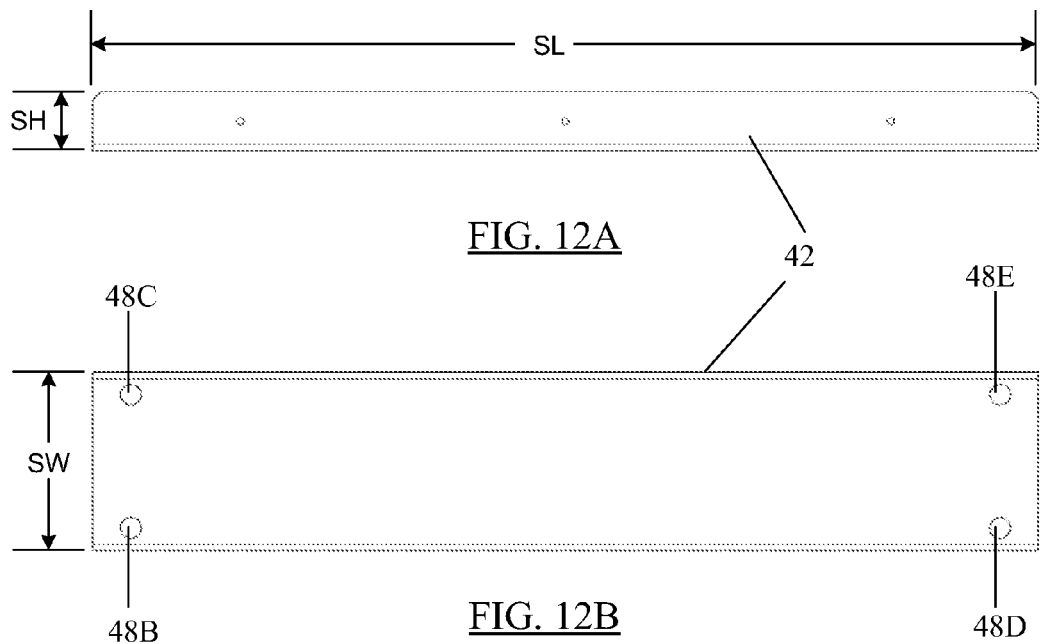
FIG. 12A
FIG. 12B

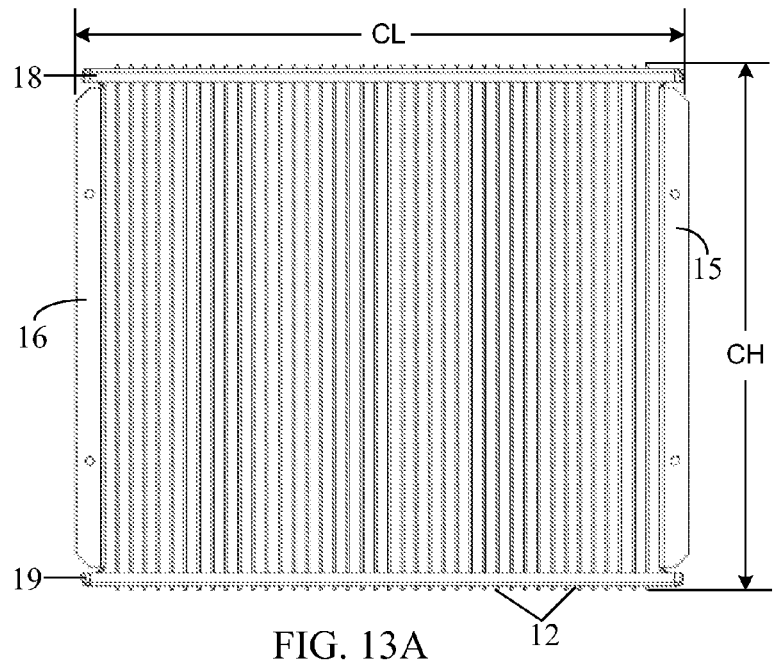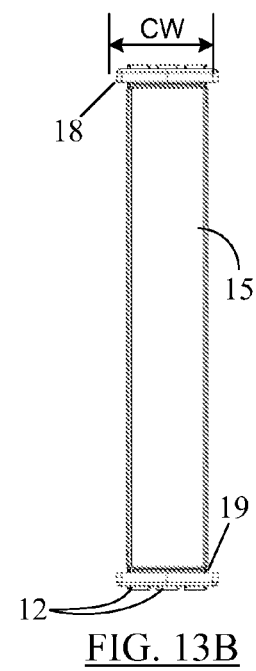
FIG. 13A   FIG. 13B
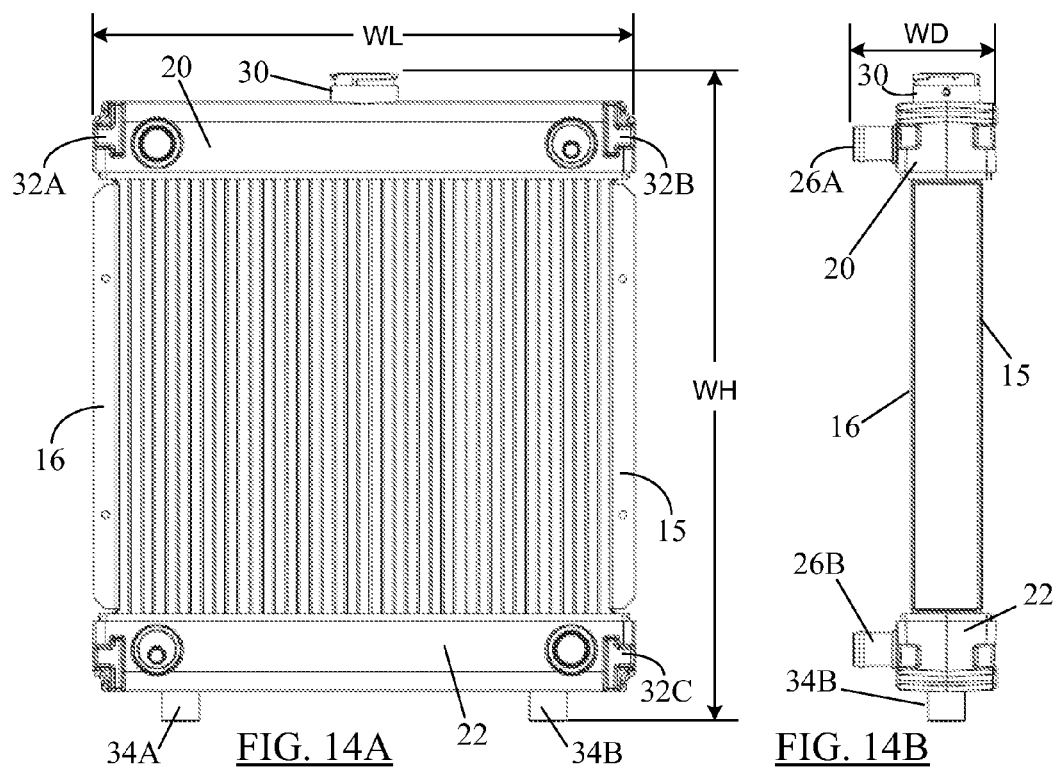
FIG. 14A   FIG. 14B

HEAT EXCHANGER TANK AND RELATED APPARATUSES

BACKGROUND

1. Field of the Disclosure

The present disclosure generally relates to the field of heat exchangers including aluminum heat exchangers used to cool internal combustion engines.

2. Brief Description of Related Art

Heat exchangers are used to transfer thermal energy from one medium to another. For example, in an internal combustion engine cooling application, heat is transferred from the internal combustion engine to the cooling fluid and the cooling fluid is itself cooled as its heat is transferred to the atmosphere when the coolant flows through a radiator. The coolant flow to and from the radiator may be pumped, and a fan may be provided in the proximity of the radiator to blow air through the radiator. In any event, the coolant flow and corresponding cooling process continues during operation of the internal combustion engine, thereby maintaining the operating temperature of the internal combustion engine within acceptable limits and preventing the engine from overheating.

At present, aluminum radiators are less expensive to manufacture in high volumes than copper or brass radiators, but tend to be less durable. A typical heat exchanger or radiator includes a manifold assembly that conducts fluid flow through a plurality of flow tubes or exposed pipes (often with fins or other means for cooling increasing surface area) to reduce the operating temperature of the internal combustion engine. A manifold assembly typically includes a tank and a header joined together. Furthermore, current aluminum compact heat exchanger designs that use aluminum tanks either require the use of aluminum sidebrackets or secondary machining operations to use steel sidebrackets. The aluminum sidebrackets furthermore tend to lack the strength and cost advantages of the steel sidebrackets that are commonly used on copper and brass radiators.

More particularly, current aluminum compact heat exchanger designs utilize a variety of tanks—plastic tanks, formed tanks, fabricated tanks, or cast tanks. Plastic tanks are mainly used for mass production, but may not be cost effective for production levels below about 100,000 units per year. A formed tank, on the other hand, does not provide for ready assembly to the sidebrackets. Therefore, sidebrackets are generally welded or brazed to the core or the tank and, hence, are often made of aluminum, which is more expensive and weaker than steel. Fabricated tanks may not be cost effective for production quantities over about 500 units per year.

However, current cast tank designs fail in creating an interchangeable tank that has a consistent tank-to-header seam location whenever such a tank is mounted on a header. One reason for such inconsistent tank-to-header seam location is the inconsistent core height growth during the core baking process (i.e., during the fin-to-tube and tube-to-header brazing process). This inconsistent tank-to-header seam location results in variations in tank-to-header welding locations for each tank-header pair and, hence, makes it difficult to use robotic welding to attach the tanks to the headers. Misaligned or improperly seated tanks, furthermore, are undesirable because they can result in leaks after the tank is welded to the header.

Even in the case where aluminum sidebrackets are used, problems could arise when such sidebrackets are welded to the core or tanks of the heat exchanger. Such welded sidebrackets may fail to accommodate thermal expansions (of the core or the tanks) that occur, for example, during welding or brazing or even under normal operating conditions. When no adequate means are provided to accommodate thermally expanding metals, damage to the core may result in the case where such welded aluminum sidebrackets are utilized.

Therefore, it is desirable to provide an all aluminum (or aluminum alloy) industrial heat exchanger (i.e., radiator) that provides consistency in tank-to-header joint locations to better allow for the use of robotic welding to attach tanks to headers.

It is also desirable that a heat exchanger include a cast tank manufactured from aluminum or aluminum alloy and be suitable for robotic welding without the need for machining the tank.

It is further desirable to devise a sidebracket mounting mechanism for a radiator that permits the use of stronger steel sidebrackets on an aluminum core, while allowing for thermal expansion of the core without the need for machining the tank.

SUMMARY

In one embodiment, the present disclosure relates to a cast tank to be used as part of a heat exchanger, and a method of forming such a cast tank. The cast tank comprises an elongate aluminum housing having a substantially U-shaped cross section. The housing includes: a pair of longer side panels having a length and a pair of ends, wherein each longer side panel has a first outer surface and a first inner surface; a top panel; a pair of shorter side panels having a length that is shorter than the length of the longer side panels and a pair of ends wherein each shorter side panel has a second outer surface and a second inner surface and each end of each shorter side panel meets an end of one of the longer side panels forming a juncture; and an indentation at each end of the top panel (e.g., at the juncture of the pair of longer side panels and the pair of shorter side panels). In one embodiment, the indentation may be approximately T-shaped. In the cast tank, portions of each first inner surface and each second inner surface are configured to be mounted on a header of a core in the aluminum heat exchanger so as to enable welding of the cast tank onto the core.

In another embodiment, the present disclosure relates to a header to be used as part of a core of a heat exchanger, and a method of forming such a header. The header comprises: a base portion including a plurality of apertures therein for receiving fluid-carrying tubes of the heat exchanger therethrough; a drafted wall circumferentially surrounding the base portion and slanted to the plane thereof; and a curved fillet linking the base portion to the drafted wall and providing alignment support during welding of a tank onto the core. The drafted wall provides an attachment surface for welding the tank onto the core.

In a further embodiment, the present disclosure relates to a core of a heat exchanger. The core comprises: a plurality of fluid-carrying tubes; a plurality of fins interleaved with the plurality of fluid-carrying tubes, wherein a set of fins from the plurality of fins is disposed along a first pair of opposite sides of the core; and a pair of headers, wherein each header in the pair of headers is disposed over the plurality of fluid-carrying tubes along a corresponding one of a second pair of opposite sides of the core. Each header is configured as provided in the preceding paragraph.

In a still further embodiment, the present disclosure relates to an aluminum heat exchanger that comprises an aluminum core and a pair of cast tanks as provided in the preceding paragraphs. The heat exchanger further includes a pair of steel sidebrackets for strength and support. A method of obtaining and assembling various parts of the heat exchanger is also contemplated according to one embodiment of the present disclosure.

In a still further embodiment, the present disclosure relates to an all-aluminum (or aluminum alloy) industrial heat exchanger (or radiator) that provides consistency in tank-to-header joint locations to allow use of robotic welding of tanks to headers. A header design that includes the combination of a curved fillet and a drafted wall facilitates easy insertion of the radiator tank onto the core of the radiator and allows for different vertical core growth during baking of the core. The tanks may be made by casting, so that they do not require machining. The inner surface of the aluminum cast tank is welded onto the header and is configured to match in geometry with that of the drafted wall of the header. Alternately, the tanks may be may be made of plastic and may, for example, be molded.

Each tank may include suitably-shaped indentations (e.g., approximately sideways T-shaped indentations in an embodiment) to facilitate linking the tanks to sidebrackets using sidebracket mounts (or isolators). For example, the indentations may be located at the four corners of the cast tank, as is illustrated in FIGS. 8A-8D. Attaching the tank to the sidebracket or otherwise to a heat exchanger using the sidebracket mounts permits the tank and the sidebracket, core, or other part of the heat exchanger to which the tank is attached to expand and contract at different rates. In that way, separation of the tank from that to which it is attached is less likely to result in damage to the assembly. In certain embodiments, a cast aluminum or molded plastic tank is coupled to a strong, inexpensive steel sidebracket by way of the isolators to permit the materials of the tank and sidebracket to move with respect to one another.

Sidebrackets may be captured by attaching nuts to the threaded inserts of the sidebracket mounts, without requiring any machining, welding or brazing. The sidebracket mounts or isolators thus allow for flexible mounting of sidebrackets, to accommodate thermal expansion of the core without causing damage to the core.

In a still further embodiment, a heat exchanger assembly includes: a tank having at least two indentations; and one or more isolators, each isolator having a base at least partially disposed in one of the indentations and a coupler extending from the base for coupling the tank to at least one other component of the heat exchanger.

In a still further embodiment, a tank to be used as part of a heat exchanger includes an elongate housing having a substantially U-shaped cross section, wherein the elongate housing includes: a pair of longer side panels, wherein each longer side panel has a first outer surface and a first inner surface; a top panel; a pair of shorter side panels, wherein each shorter side panel has a second outer surface and a second inner surface; and at least two indentations, each indentation in at least one of said pair of longer side panels, said top panel, and said pair of shorter side panels.

Other embodiments, which may include one or more parts of the aforementioned method or systems or other parts, are also contemplated, and may thus have a broader or different scope than the aforementioned method and systems. Thus, the embodiments in this Summary of the Invention are merely examples, and are not intended to limit or define the scope of the invention or claims.

BRIEF DESCRIPTION OF THE DRAWINGS

For the present disclosure to be easily understood and readily practiced, the present disclosure will now be described for purposes of illustration and not limitation, in connection with the following figures, wherein:

FIGS. 5A-5C illustrate constructional details of an exemplary set of fins according to one embodiment of the present disclosure;

FIGS. 6A and 6B show top and front views, respectively, of the header shown perspectively in FIGS. 1 and 4;

FIG. 7 shows cross-sectional details of a header according to one embodiment of the present disclosure;

FIG. 8A depicts a top view of an embodiment of a cast tank;

FIGS. 8B-8C depict cross-sectional details of the cast tank of FIG. 8A;

FIG. 8D illustrates an end view of the cast tank of FIGS. 8A-8C;

FIG. 9A depicts a larger top view of the cast tank shown in FIG. 8;

FIG. 9B depicts a front view of the cast tank of FIG. 9A

FIGS. 11A and 11B illustrate side and end views, respectively, of an isolator (or a sidebracket mount) according to one embodiment of the present disclosure;

FIGS. 12A and 12B depict front and top views, respectively, of a sidebracket according to one embodiment of the present disclosure;

FIG. 13A illustrates a front view of an embodiment of a core;

FIG. 13B illustrates an end view of the embodiment of the core illustrated in FIG. 13A;

FIG. 14A illustrates a front view of another embodiment of a weldment;

FIG. 14B illustrates an end view of the embodiment of the weldment illustrated in FIG. 14A;

DETAILED DESCRIPTION

Figure 1:
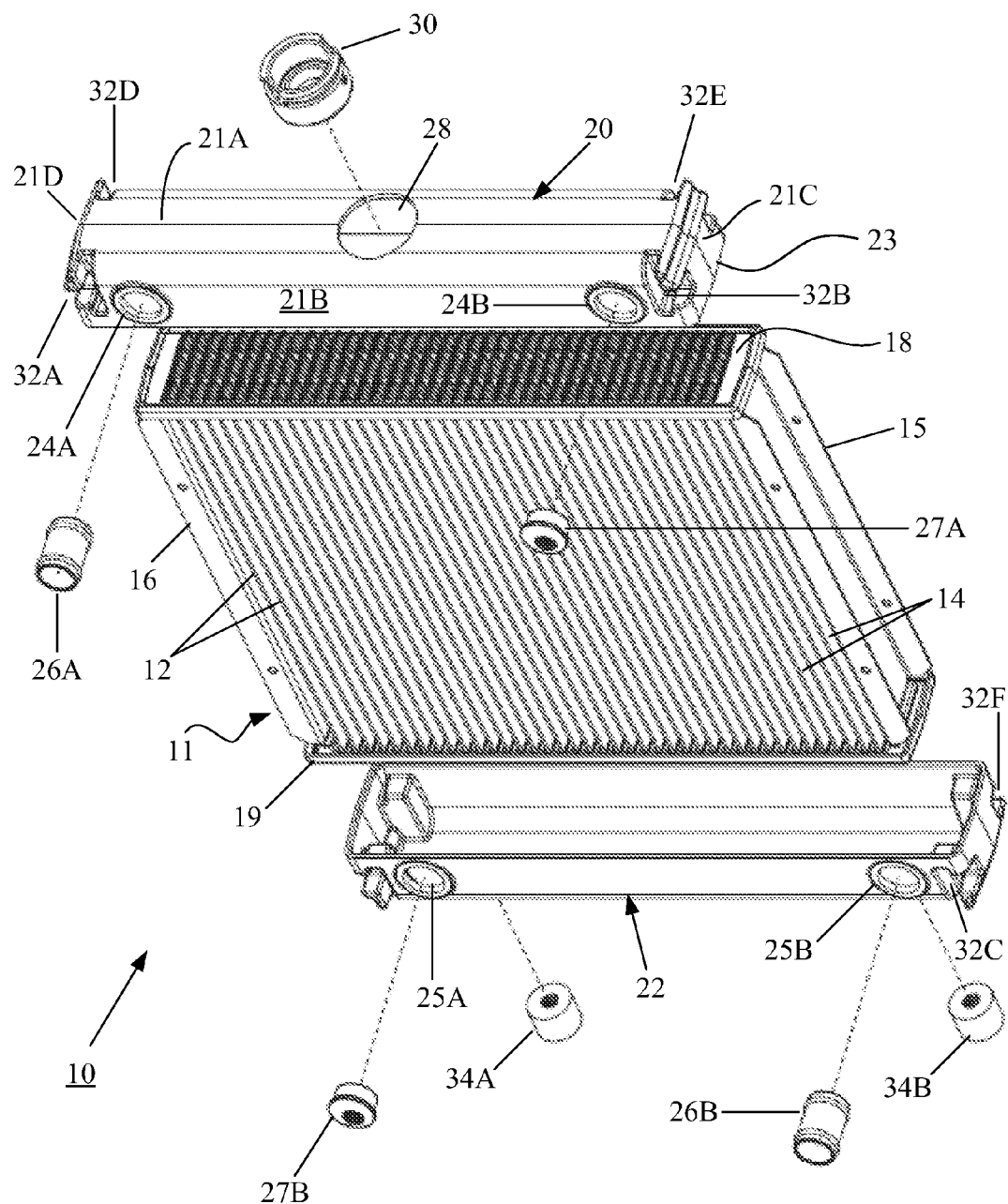
FIG. 1 illustrates a perspective view of an aluminum weldment of an exemplary industrial heat exchanger (or radiator) according to one embodiment of the present disclosure.

The accompanying figures and the description that follows set forth the present disclosure in embodiments of the present disclosure. However, it is contemplated that persons generally familiar with mechanical designs, and more particularly with designs of industrial heat exchangers, will be able to apply the teachings of the present disclosure in other contexts (e.g., for automotive radiators) by modification of certain details. Accordingly, the figures and description are not to be taken as restrictive of the scope of the present disclosure, but are to be understood as broad and general teachings. In the discussion herein, when any numerical value is referenced, such value is understood to be a practically-feasible design approximation taking into account variances that may be introduced by such mechanical operations as machining, tooling, drilling, casting, etc.

It is observed at the outset that the directional terms such as "top," "bottom," "right," "left," "horizontal," "vertical," "upper," "lower," etc., and derivatives thereof are used herein for illustrative purpose only to facilitate description and understanding of relative positions of various mechanical components or parts constituting the aluminum heat exchanger according to the teachings of the present disclosure. Hence, such terms and derivatives thereof shall relate to the present disclosure as it is oriented in the drawing figures provided herein.

It is further observed here that the mechanical structures, components, assemblies, or engineering drawings thereof illustrated in various figures in the instant application are not drawn to scale, but are rather illustrated for the convenience of understanding various design aspects of an aluminum heat exchanger according to the teachings of the present disclosure. Additionally, the terms "heat exchanger" and "radiator" are used interchangeably herein to refer to a cooling mechanism used, for example, in an industrial internal combustion (IC) engine. It is noted here that although the discussion below primarily refers to industrial heat exchangers for internal combustion engines, various heat exchanger designs discussed herein may be equally used in automotive applications (e.g., as car radiators) and also with non-engine coolers such as, for example, hydraulic oil coolers, transmission oil coolers, charge-air coolers, etc., used in various industrial applications (e.g., oil coolers used to cool hydraulic oil in a tractor or charge-air coolers used to cool turbo-charged air for a turbo charged internal combustion engine). Also, the term "aluminum" in the discussion below is used for the sake of convenience only; it may be construed to include a pure aluminum material or an aluminum alloy material.

FIG. 1 illustrates a perspective view of an aluminum weldment 10 of an exemplary industrial heat exchanger (or radiator) 36 (shown in detail in FIG. 2) according to one embodiment of the present disclosure. The aluminum weldment 10 may include an aluminum core 11 and two aluminum cast tanks 20, 22. The core 11 may comprise a plurality of fluid-carrying (e.g., radiator coolant-carrying) tubes 12 interleaved with a plurality of elongate fins 14. A pair of side plates 15, 16 also may be mounted on the outermost fins 14 along two opposite sides of the core 11 as shown in FIG. 1 for additional strength and support to the core 11. The core 11 may further include a pair of headers 18, 19 disposed over fluid-carrying tubes 12 along two other opposite sides of the core 11 as also shown in FIG. 1. The members of the core 11—i.e., the two headers 18-19, the tubes 12, the fins 14, and the side plates 15-16—may be made of aluminum or aluminum alloy materials and brazed to each other during a baking process. Fins may be brazed to tubes, and tubes may be brazed to headers during the brazing process as is known in the art. A more detailed view of various components of the core 11 is provided in FIG. 4, which is discussed later below. Each of the cast tanks 20, 22 is in the form of an elongate aluminum housing 20, 22 having a substantially U-shaped cross section (not shown in FIG. 1, but illustrated in more detail in FIGS. 8 and 9). For the ease of discussion, the same reference numerals ("20" and "22") are used to interchangeably refer to the cast tank and aluminum housing forming the cast tank.

Each cast tank 20, 22 may be made of aluminum or aluminum alloy material. Because tanks 20, 22 are cast around an inner core, the raw (not machined) inside surfaces will have a tighter dimensional tolerance and, hence, a tank 20, 22 will be more easily welded to the core 11 using this surface than either the raw outside or raw bottom surfaces. Each aluminum housing 20, 22 further includes a top panel 21A and a side 21B-21D that may include a pair of longer side panels 21B and a pair of shorter side panels 21C-21D, the side 21B-21D terminating at a rim 23. For ease of illustration, the top panel 21A, one longer side panel 21B, and two shorter side panels 21C-21D of the cast tank 20 are identified in FIG. 1. However, although similar identifications are not provided for the cast tank 22 in FIG. 1 for the sake of simplicity, these constructional details may be evident from the illustration in FIG. 1. Each cast tank 20, 22 may further include one or more indentations.

For example, in an embodiment, each cast tank 20, 22 may include a suitably-shaped indentation at each end of the top panel (at the juncture of the pair of longer side panels 21B and shorter side panels 21C-21D). In the embodiment of FIG. 1, the cast tanks 20, 22 are shown with approximately sideways (as illustrated in FIGS. 1-3, 8, and 9) T-shaped indentations. Some of these indentations are identified in FIG. 1 by reference numerals 32A-32F. Additional cross sectional details of a cast tank (e.g., the cast tank 20) with these indentations are provided in FIGS. 8 and 9 and discussed below. These indentations permit simple mounting of sidebrackets of any suitable metal (e.g., steel sidebrackets 42 and 44 in FIG. 2) onto the weldment 10 without the need for secondary machining, welding or brazing, while allowing for thermal expansion of the core 11 and the cast tanks without causing damage to the core, as discussed below.

Each indentation (e.g., one or more of 32A-32F) may be located otherwise as desired. For example, one or more indentations may be located in the top panel (e.g., 21A), one or both longer side panels (e.g., one or both of 21B), or one or both shorter side panels (e.g., one or both of 21C-21D). In various embodiments, one or more indentations may be located in at least one of the pair of longer side panels, the top panel, and the pair of shorter side panels, and thus in any combination of that top panel, one or both longer side panels, and one or both shorter side panels. For example, in one such embodiment, one or more indentations may be formed in the top panel. In another embodiment, one or more indentations may be formed in a top panel and further in one or both a longer side panel and shorter side panel. For example, as described herein, each of four indentations may be formed at a different one of the four corners of the top panel, and thus at the juncture of the top panel, a longer side panel, and a shorter side panel.

In the embodiment of FIG. 1, each cast tank 20, 22 further includes a pair of holes 24A-24B and 25A-25B, respectively, formed in a spaced-apart manner on one of the longer side panels 21B. These holes permit welding or other attachment of connections apparatuses and connection plugs to the respective cast tank 20, 22. For example, connection 26A and connection plug 27A may be welded to the cast tank 20, whereas connection 26B and connection plug 27B may be welded to the cast tank 22 via respective holes as shown in FIG. 1. The connections 26A-26B may function as fluid inlet and outlet ports for entry and exit of radiator coolant into and out of the radiator 36 during operation of the heat exchanger 36. One of the cast tanks (e.g., the cast tank 20 in FIG. 1) may also include an inlet hole 28 formed on its top panel 21A to receive a fillneck 30 to be welded to the cast tank 20 for external fluid input and to receive a pressure regulating cap (not shown). The holes 24A-24B and 25A-25B also allow attachment of additional radiator components (not shown in FIG. 1, but shown in FIG. 2) such as a petcock 38, a fillneck connection 40, and an NPT (national pipe thread) plug 39 for an LCI (low coolant indicator) to the respective cast tank 20, 22. Radiator bottom mounts 34A-34B may be attached to the bottom cast tank 22 as illustrated in FIG. 1 to provide for mounting.

In one embodiment, all the holes (24A-24B, 25A-25B, and 28) and all indentations (e.g., T-shaped indentations 32A-32F) are cast into the aluminum housing of their respective cast tank 20, 22 along with the housing structure (including its top panel 21A, longer side panels 21B, and shorter side panels 21C-21D) so as to form a unitary structure for the cast tank 20, 22 as can be seen from various figures herein, including FIGS. 1-3, 8, and 9. The holes in the aluminum housing may be formed by casting tubes into the tank. After connections 26A and 26B and connection plugs 27A and 27B are welded to respective cast tanks 20, 22, each cast tank 20, 22 may be welded to the core 11 to assemble the weldment 10. The internal surface (not shown in FIG. 1, but illustrated in FIG. 8) of each cast tank 20, 22 is mounted on and welded to the respective adjacent header 18, 19 of the core 11 without requiring the cast tank 20, 22 to be machined prior to the welding. Once the welding is complete, petcock 38, plug 39 and fillneck connection 40 may be screwed into the weldment 10.

Figure 2:
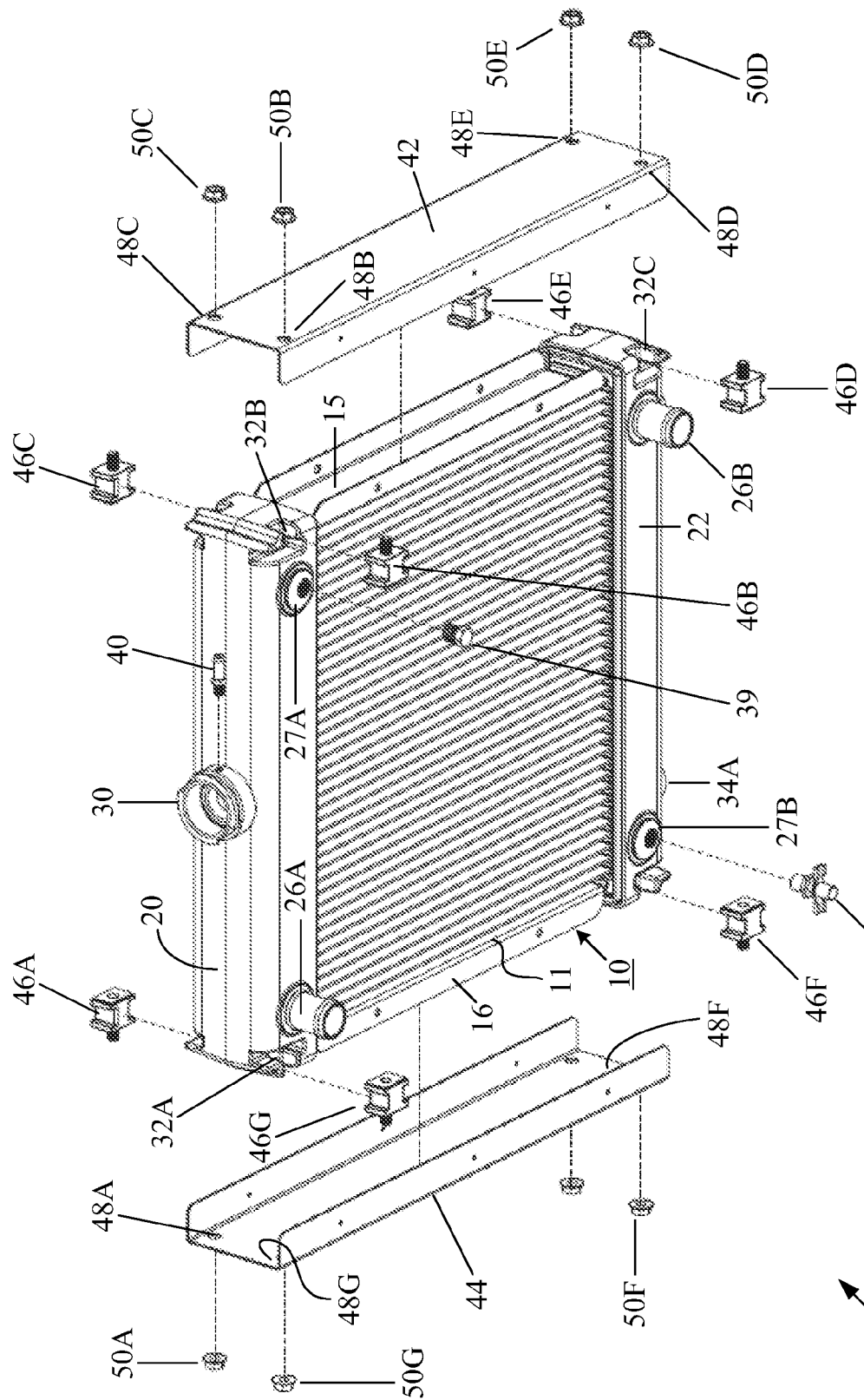
FIG. 2 shows another perspective view depicting additional components of the heat exchanger according to one embodiment of the present disclosure.
Figure 3:
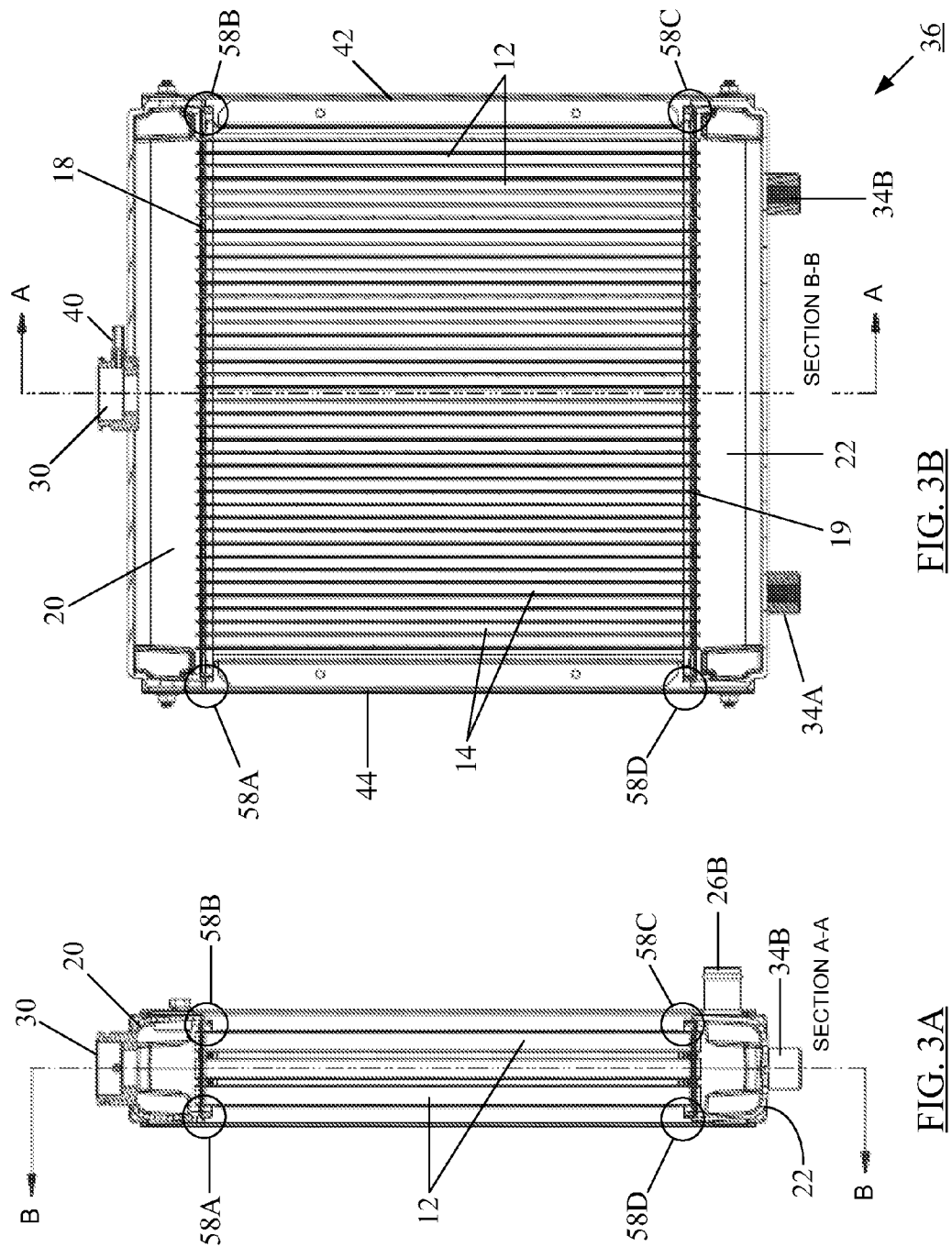
FIGS. 3A and 3B depict cross-sectional views of a fully-assembled heat exchanger according to one embodiment of the present disclosure.

FIG. 2 shows another perspective view depicting additional components of the heat exchanger 36 according to one embodiment of the present disclosure. The discussion of weldment 10 and its parts shown in FIG. 1 is not repeated herein for the sake of brevity. Although petcock 38, NPT plug 39 for LCI, and fillneck connection 40 were not shown in FIG. 1, they have been previously discussed in conjunction with discussion of the weldment 10 in FIG. 1. Hence, only the sidebrackets 42, 44 and their mounting mechanism will be discussed herein with reference to FIG. 2. As mentioned earlier, the indentations (32A-32C, etc.) in the cast tanks 20, 22 permit simple mounting of sidebrackets 42, 44 (of any suitable metal) onto the weldment 10 without the need for secondary machining, welding or brazing. The sidebrackets 42, 44 may be made of steel, because steel sidebrackets 42, 44 provide strength and cost advantages that may not be available with aluminum sidebrackets 42, 44. However, in current radiator designs, usage of steel sidebrackets 42, 44 on an aluminum core would require secondary machining operations, for example, to add threaded holes to tanks 20, 22. On the other hand, if weaker (and generally more expensive) aluminum sidebrackets are selected, then additional welding or brazing operations may be needed, for example, to assure secure attachment of these aluminum sidebrackets 42, 44 to the core. Furthermore, heat exchanger designs should provide a method to allow for different amounts of thermal expansion between the core and the sidebrackets. The sidebracket mounts (discussed below) allow for a thermal expansion of a core.

In one embodiment of the present disclosure, the need to adequately accommodate for thermal expansion of the core 11 and the need to preferably avoid secondary machining or welding/brazing operations may be satisfied by using a flexible sidebracket mounting mechanism that includes a plurality of sidebracket mounts or isolators, some of which are identified as parts 46A-46G in FIG. 2. As shown in FIG. 2, each elongate sidebracket 42, 44 (e.g., of steel) is mounted over a corresponding side plate 15 or 16 along a corresponding one of two opposite sides of the core 11. Each sidebracket mount or isolator (e.g., isolators 46A-46G) may comprise a base 90 that may be a substantially I-shaped material formed, such as by molding, around a coupler 92, which may be a threaded rod inserted into the base 90, an unthreaded rod that accepts, for example, a cotter pin, or any other coupler or coupling mechanism desired. Details of an exemplary sidebracket mount according to one embodiment of the present disclosure are shown in FIG. 11, which is discussed below. The I-shaped material may be any of the different types of flexible materials including, for example, a metal, plastic or elastomer. Each sidebracket mount 46A-46G fits into a corresponding indentation (e.g., 32A-32E) in the respective cast tank 20, 22 as depicted in FIG. 2. Each sidebracket 42, 44 may have a hole (some of which are identified as holes 48A-48G in FIG. 2) in each corner of the sidebracket 42, 44 through which the coupler 92 (as illustrated in FIG. 11A) of the respective isolator 46A-46G may appear for mounting the sidebracket 42, 44 over a corresponding side plate 15, 16. Fasteners, such as nuts (e.g., the nuts 50A-50G identified in FIG. 2), may attach to the coupler 92 appearing through the holes in the sidebrackets 42, 44, thereby securely linking the sidebrackets 42, 44 to the tanks 20, 22 and, hence, mounting them over the respective side plates 15, 16 of the core 11.

The sidebracket mounts (e.g., mounts 46A-46G shown in FIG. 2) thus permit the use of (stronger and less expensive) steel sidebrackets 42, 44, shroud and core guard (not shown) without the need to resort to secondary machining or welding/brazing operations because the sidebracket mounts (e.g., mounts 46A-46G shown in FIG. 2) provide a method of attachment and avoid the extensive contact between two dissimilar metals—the steel of sidebrackets 42, 44 versus the aluminum of the core 11. In one embodiment, the sidebracket mounts (e.g., mounts 46A-46G shown in FIG. 2) may provide vibration damping and isolation, and allow for core 11 to expand by a different amount than sidebrackets 42, 44.

It is reiterated here that the simplified depiction of the heat exchanger 36 and its parts in FIGS. 1-2 (and elsewhere in the present application) is for illustrative purpose only. It is further noted because of their lack of relevance to the present discussion and the availability of many known configurations, all constructional details of heat exchangers and radiators are not shown herein for ease of illustration.

FIGS. 3A and 3B depict cross-sectional views of a fully-assembled heat exchanger (e.g., the heat exchanger 36 shown in FIG. 2) according to one embodiment of the present disclosure. Some parts are identified in FIGS. 3A-3B for ease of reference. However, for the sake of clarity and brevity, all parts discussed hereinbefore are not labeled in FIGS. 3A-3B, nor is the earlier discussion of those parts repeated herein. FIGS. 3A and 3B show in detail how cast tanks 20, 22 are engaged with their respective headers 18, 19. The tank-to-header seam locations are designated by circles identified by reference numerals 58A through 58D in FIGS. 3A-3B. The substantially U-shaped configuration of a cast tank's aluminum housing is also visible in the cross sections of FIGS. 3A-3B. It is seen from FIGS. 3A-3B that the slanted inner surface (shown in more detail as exemplary surfaces 76A-76B in FIGS. 8B-8C) at the open end of a cast tank 20, 22 consistently mounts onto an outwardly slanted drafted wall of a header 18, 19 (shown in more detail as wall 72 in FIG. 7 and discussed below) to provide a header-tank welding location that minimizes part-to-part variations and aids in the use of a robotic welder for mass welding of header-tank pairs.

Figure 4:
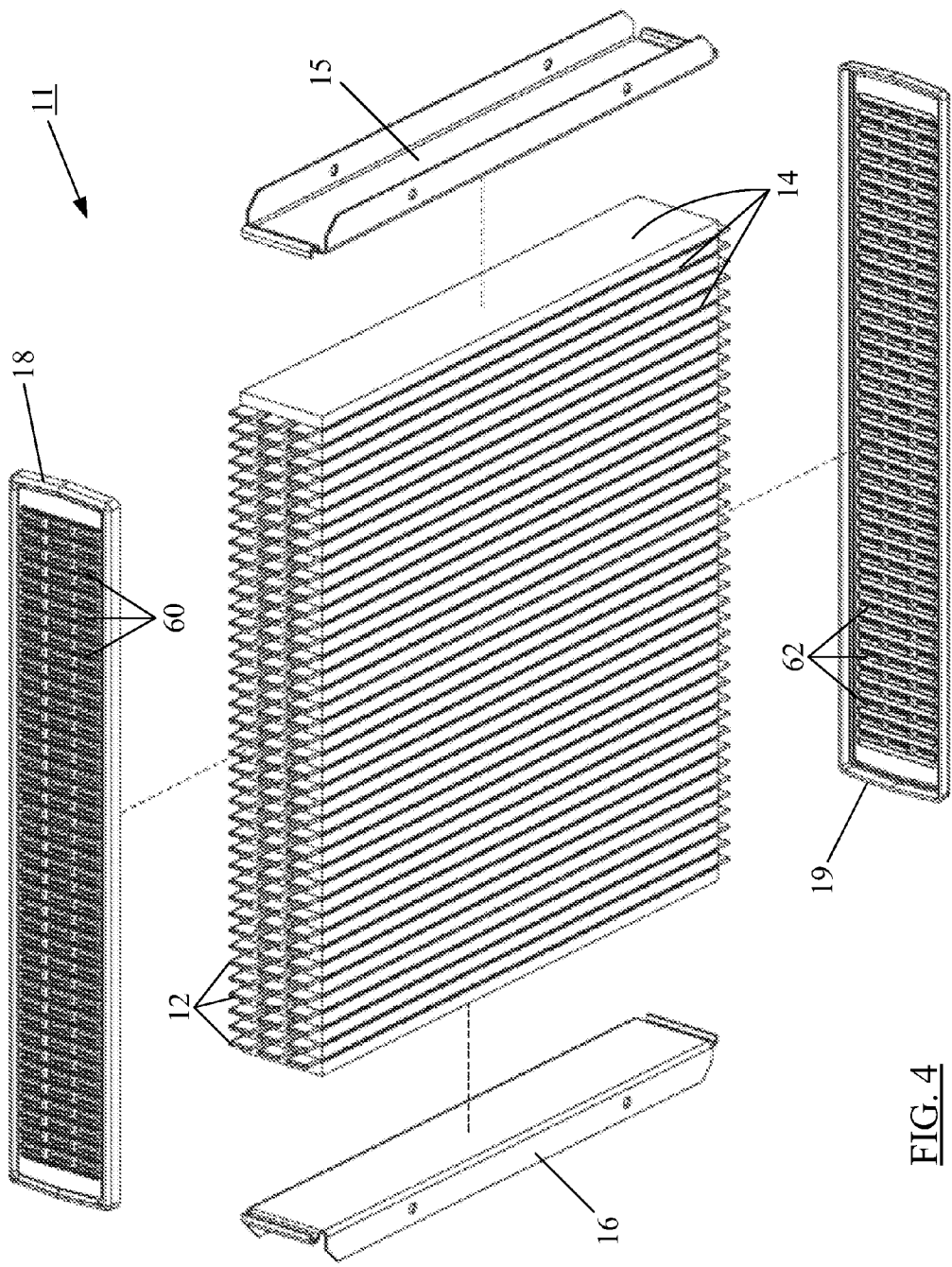
FIG. 4 shows component details of the core illustrated in FIGS. 1 and 2.

FIG. 4 shows component details of the core 11 illustrated in FIGS. 1 and 2. These component details are shown to more clearly depict the headers 18, 19 according to one embodiment of the present disclosure. As mentioned before, the aluminum core 11 may include a pair of aluminum headers 18, 19, a plurality of fluid-carrying aluminum tubes 12 interleaved with a plurality of aluminum fins 14, and a pair of aluminum side plates 15, 16. As shown in FIG. 4, in one embodiment, the fluid-carrying tubes 12 may be organized in a plurality of groups, wherein each group may include an identical number of tubes (e.g., three tubes per group as shown in FIG. 4). These groups of tubes may be interleaved with the fins 14 such that a set of fins may be disposed externally along a first pair of opposite sides of the core 11 as illustrated in FIG. 4. The fins 14 may carry heat from the tubes 12 and transfer that heat to air flowing through the fins and around the tubes 12 so as to enable transfer of heat from the heated coolant (flowing in the tubes 12) to the ambient atmosphere. A pair of side plates 15, 16 may be disposed over ends of the set of fins 14. The headers 18, 19 may be mounted on a second pair of opposite sides of the core 11 as shown in FIG. 4. Each header 18, 19 may include a plurality of apertures (or openings) 60, 62, respectively, for receiving the fluid-carrying tubes therethrough. The tubes 12 may then be brazed or otherwise attached to the headers 18, 19 as part of core 11 formation, also known as "baking the core 11." Additional constructional details of the headers 18, 19 are discussed below with reference to FIGS. 6 and 7. As also mentioned before, all the components of the core 11 shown in FIG. 4 may be brazed to each other during a baking process to form a unitary structure for the core 11 as illustrated in the cross-section of FIG. 3B.

Before addressing details of the header 18, 19 design according to one embodiment of the present disclosure, FIGS. 5A-5C are discussed herein to provide additional details of an exemplary elongate fin (or set of fins) 14. FIG. 5C depicts a side view of elongate fin 14. FIG. 5A depicts a front view of elongate fin 14. FIG. 5B is a cross-sectional view taken along the lines A-A in FIG. 5A. The elongate fin is comprised of a plurality of individual fins forming zigzag pattern as shown in FIG. 5C. The fins extend between the opposite sides of core 11. Louvers 64 consist of sections of elongate fin 14 being cut and bent. The louvers 64 redirect the atmospheric air and serve to increase the heat transfer rate as is known in the art. It is noted here that although the reference numeral "14" refers to a set of fins, in the discussion herein, a single reference numeral "14" is used to interchangeably refer to such terms as "fin," "fins," "set of fins," "elongate fin," etc., for ease of discussion. The usage of the reference numeral "14" throughout the discussion herein to refer to "fins" (either singly or collectively) may be evident from the relevant context.

FIGS. 6A and 6B show top and front views, respectively, of a header (e.g., the header 18) shown perspectively in FIGS. 1 and 4. Each header 18, 19 in this embodiment is identical in construction and, hence, only one header 18 is shown in FIGS. 6A-6B. The apertures 60 and the overall contour of the header 18 are clearly visible in FIG. 6A. In one embodiment, the width ("HW") of the header 18 is approximately 76 mm (3.00 inches), the length ("HL") of the header 18 is approximately 449 mm (17.7 inches), and the peripheral height ("HH") of the header 18 is approximately 10 mm (0.4 inches). Additional constructional details of the header 18 are shown in the cross-section view in FIG. 7 taken along the lines A-A in FIG. 6A.

As mentioned above, FIG. 7 shows cross-sectional details of the header 18 according to one embodiment of the present disclosure. The header 18 may be made of aluminum or aluminum alloy suitable for allowing brazing of the header 18 to the fluid-carrying tubes 12 and also for allowing the header 18 to be welded to the aluminum cast tank 20. In one embodiment, the header 18 is formed by stamping. The header 18 may include a substantially planar base portion 68 that comprises the plurality of apertures 60 for receiving the fluid-carrying tubes 12 therethrough. The header 18 may further include a curved fillet 70 and a drafted wall 72. The drafted wall 72 may circumferentially surround the base portion 68 and may be slightly outwardly slanted (instead of being perpendicular) to the plane of the base portion 68 as can be seen in FIG. 7. Thus, opposing sides of the drafted wall 72 (e.g., as shown in FIG. 7) are progressively farther apart as they extend from the curved fillet 70. In other words, the drafted wall 72 is formed in the direction of the core 11 (of which the header 18 is a part) and provides an attachment surface for welding the tank 20 onto the header 18 as discussed in more detail later below. The curved fillet 70 functions to link the base portion 68 to the drafted wall 72 and provides alignment support to the tank 20 during welding of the tank 20 onto the header 18. The curvature of the curved fillet 70 may be configured to accommodate the slightly slanted orientation of the drafted wall 72 (respective to the plane of the base portion 68) so as to provide a unitary structure for the header 18 having a cross-sectional continuity from the inner base portion 68 to the outer drafted wall 72. Regarding the extent of curvature of the curved fillet 70, it is seen from FIGS. 7 and 3A that, in one embodiment, the curvature of the curved fillet 70 may be such that the plane tangential to the top of the curved fillet 70 is parallel to and higher than the plane containing the top surfaces of the apertures 60, but lower than the plane tangential to the tops of the fluid-carrying tubes 12 when those tubes 12 are received by the base portion 68.

In the embodiment of FIG. 7, the combination of the drafted wall 72 and the curved fillet 70 results in maintaining a consistent tank-to-header seam location (discussed further with reference to FIGS. 8 and 9 below) for fitting and during welding of the tank 20 onto the core 11 despite occurrence of different amounts of core growth during baking of the core 11 (i.e., during brazing of different parts of the core 11). Thus, the header design enables easy insertion of the tanks onto the core in a manner that permits the tanks to maintain a consistent spacing when mounted on the headers despite different amounts of core growth that occur during the baking of the core. This consistency in the location of tank-to-header joints permits the use of a robotic welder so that both superior quality and reduced costs result.

It is noted here that the terms "base portion," "curved fillet," and "drafted wall" are used herein for the sake of convenience only to illustrate and discuss structural details of the header 18. These terms do not imply piecemeal construction of the header 18 or that the header 18 is composed of disjointed parts. The entire header 18 may be formed in such a manner as to result in a unitary, homogenous structure that has cross-sectional continuity throughout its metallic composition. In other words, the header 18 is not necessarily formed by forming each "part" 68, 70, 72 individually and then "joining" these parts to arrive at the final header structure. Rather, the header 18 may be a unitary, homogenous structure, having all of its "parts" formed simultaneously.

FIGS. 8A-8D and FIGS. 9A-9B depict cross-sectional details of a cast tank (e.g., the cast tank 20) according to one embodiment of the present disclosure. It is noted here that although all components in the cross-sectional views in FIGS. 8A-8D and FIGS. 9A-9B are not identified for the sake of simplicity, these components can be easily recognized when these cross-sectional views are compared against the perspective views in FIGS. 1 and 2. In the top view of FIG. 8A, the approximately T-shaped indentations 32A-32B and 32D-32E at the corners of the cast tank 20 (i.e., at the juncture of the longer and shorter side panels of the cast tank) are identified along with the inlet hole 28 and side holes 24A-24B. The top view in FIG. 9A is substantially similar to that in FIG. 8A and, hence, additional details are not provided in FIG. 9A. The sideways (as depicted in FIG. 9B) T-shape of the corner indentations 32A-32B and 32D-32E in the cast tank housing 20 is more clearly visible in the front view of FIG. 9B along with the side holes 24A-24B. As noted before, the indentations (e.g., 32A-32B and 32D-32E for tank 20) in the cast tanks allow flexible linking of the weldment 10 to the steel sidebrackets 42, 44 (FIG. 2) for providing strength and support to the heat exchanger 36 (FIG. 2) and for accommodating thermal expansion of the core 11 without causing damage to the core 11. The substantial U-shape of the aluminum housing of the cast tank 20 is visible in the front views of FIG. 8B (taken along the sectional lines A-A in FIG. 8A) and 9B, and in the side view of FIG. 8C (taken along the sectional lines B-B in FIG. 8A). With reference to FIGS. 9A-9B, in one embodiment, the width ("TW") of the cast tank 20 is approximately 84 mm (3.3 inches), the length ("TL") of the cast tank 20 is approximately 457 mm (18 inches), and the peripheral height ("TH") of the cast tank 20 is approximately 60 mm (2.4 inches).

Referring back to FIG. 8A (and in conjunction with FIG. 1), it is observed that the top panel 21A, two longer side panels 21B and 21E, and two shorter side panels 21C-21D are also identified in FIG. 8A. It is noted here that the side panel 21E was not visible in FIG. 1 and, hence, was not identified therein. Each of the side panels may be considered to have an outer surface and an inner surface, wherein the outer and inner surfaces of each shorter side panel are identified by references "75A" and "76A," respectively, in FIG. 8B, and the outer and inner surfaces of each longer side panel are identified by references "75B" and "76B," respectively, in FIG. 8C. It is noted that, in the embodiment of FIGS. 8B-8C, each inner surface 76A-76B of the tank 20 may be slightly outwardly slanted (instead of being perpendicular) to the plane of the top panel 21A so as to facilitate insertion of the tank 20 onto the core 11. Thus, opposing inner surfaces 76A (on opposing shorter side panels 21C and 21D) and opposing inner surfaces 76B (on opposing longer side panels 21B and 21E) are, correspondingly, progressively farther apart as they extend from the top panel 21A. This outward slant coupled with a slight taper in the thickness of the tank's side panels allows the internal surfaces 76A-76B of the cast tank 20 to be mounted on the corresponding slanted attachment surface of the drafted wall 72 in the header 18 in such a manner as to provide a consistent tank-to-header seam location as indicated by references 58A through 58D in FIGS. 3A-3B. In other words, when the cast tank 20 is mounted on its corresponding header 18, the inner surfaces 76A-76B of the cast tank 20 mate consistently and well with the drafted wall 72 of the header so as to provide for a welding location that can facilitate robotic welding of each such tank-header pair.

As in the case of the header in FIG. 7, the terms such as "longer side panel," "shorter side panel," and "top panel" are used in conjunction with the cast tank in FIGS. 8-9 merely for the sake of convenience and to facilitate discussion. These terms do not imply that the cast tanks 20, 22 are fabricated using disparate or disjointed "parts" or separately manufactured "panels," which are later joined in a piecemeal manner to form the cast tanks 20, 22. Rather, like headers, the cast tanks 20, 22 according to the teachings of the present disclosure may be formed in such a manner as to result in a unitary, homogenous structure whose metallic composition has cross-sectional continuity. In other words, all of the cast tank "panels" (and their corresponding inner and outer surfaces) may be formed simultaneously during the tank casting operation. Thus, for example, the references "76A" and "76B" essentially refer to a single peripheral (continuous) "inner side surface" of the cast tank 20, the references "75A" and "75B" refer to a single peripheral (continuous) "outer side surface" of the cast tank 20, and so on for other similar structures in the cast tank 20.

Figure 10:
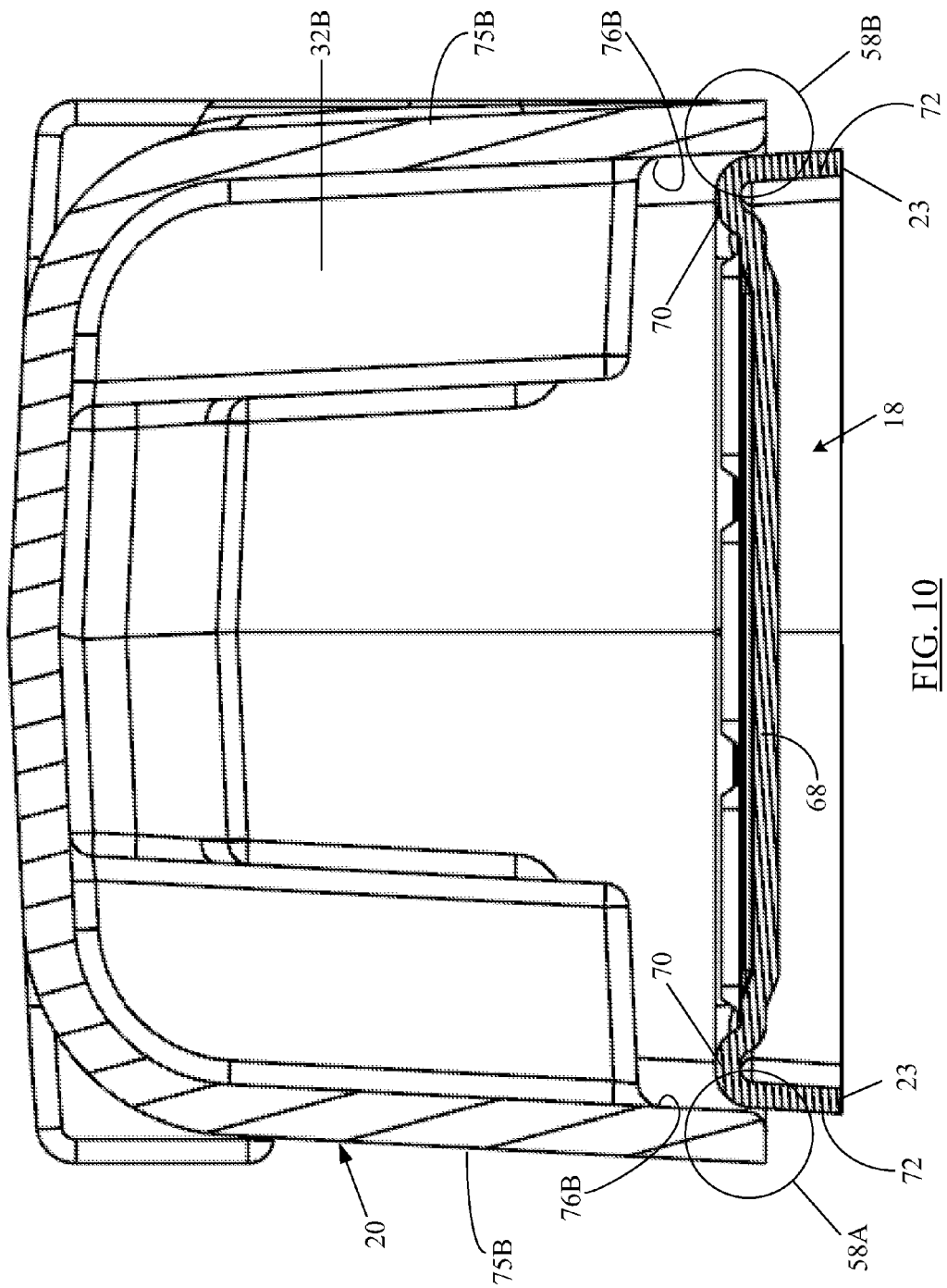
FIG. 10 shows a close-up view of tank-to-header seam locations in an embodiment where a tank is mounted on a header.

FIG. 10 shows a close-up view of the tank-to-header seam locations when a tank (e.g., the tank 20 in FIG. 1) is mounted on a header (e.g., the header 18 in FIG. 1) according to one embodiment of the present disclosure. FIG. 10 provides a magnified view of the seam locations 58A-58B, which also have been identified earlier in FIGS. 3A-3B. Although FIG. 10 focuses on the tank 20, it is evident that the other tank 22 may be mounted in a similar manner. Hence, the discussion herein applies to all tank-header joints in a heat exchanger according to the present disclosure. As noted before, the tank attachment surface provided by the drafted wall 72 of the header 18 enables easy insertion of the tank 20 onto the header 18 in a manner that permits the tank 20 to maintain a consistent spacing when mounted on the header 18, in spite of the different amounts of vertical core growth that occur during the baking of the core 11 (containing the header 18). The tank 22 may be of aluminum (or aluminum alloy—e.g., the aluminum alloy 356 known in the art as "Alloy 356" or "Aluminum 356") and may be formed by casting so as to avoid the need for machining the tank prior to welding and to also provide for tighter tolerances suitable for robotic welding. For example, a cast tank 22 may have more consistent dimensions than a tank otherwise formed, for example of sheet metal, and those consistent dimensions allow the tank 22 to be placed in consistent relation to the header 18 and/or the core 11, thus permitting a consistently repetitive robotic welder to be used to attach the cast tank 22 to the core 11. Because an aluminum casting tends to cool more consistently around its inner core, the distances between the inside walls (i.e., the internal surfaces 76A-76B) of the casting (i.e., cast tank 20) have the smallest part-to-part variations. This consistency in the tank design, when coupled with the matching geometry of the drafted wall 72 of the header 18, results in a consistent tank-to-header seam location for each tank-header pair. This not only allows interchangeable tank-header pairs (e.g., tank 20 can be used along with header 19, or with any other similar header) because of very minimal part-to-part variations, but the consistent location of tank-header joints also permits the use of a robotic welder to weld such tank-header pairs, thereby resulting in superior quality and reduced costs.

It is observed here that, during robotic welding, the cast tanks 20, 22 may be held in place (in a spaced-apart manner) by gripping the tanks 20, 22 through their indentations 32A-32F. The core 11 may be then inserted in the spacing between the tanks 20, 22 and the tanks 20, 22 may be suitably moved to snugly fit onto their corresponding headers 18, 19. After tanks 20, 22 are securely mounted over corresponding headers 18, 19, a robotic welding arm may be brought in to weld the tank's side panels (e.g., the longer side panels 21B, 21E, etc.) onto the header 18, 19 wall. The tanks 20, 22 may be mounted over the headers 18, 19 so as to provide consistency in tank-to-header seam locations and facilitate expeditious and economical robotic welding.

Furthermore, as mentioned before, the cast tank 20 may not require any machining prior to its welding onto the header 18. The lack of machining may result in improved material flow path and decreased cost because of the simpler three-step (cast-weld-assemble) process discussed herein. On the other hand, in traditional cast tank designs, additional machining may be needed to create a flat bottom tank surface to facilitate welding of the tank onto the header and to provide a method for sidebracket attachment. Although the machining may succeed in creating a flat surface, it may fail in creating an interchangeable tank design that has a consistent tank-to-header seam location whenever such a tank is mounted on a header and such machining requires additional time and effort to perform. The cast tanks 20, 22 according to the teachings of the present disclosure may provide interchangeable tank designs without the need for any machining. Such cast tanks 20, 22 may be well suited for medium production levels of at least 2000 units per year for industrial heat exchangers.

FIGS. 11A and 11B illustrate details of an isolator (or a sidebracket mount) 88 according to one embodiment of the present disclosure. Isolators 88 may be used to couple one or more tanks 20, 22 to one or more components of the heat exchanger, such as one or more sidebrackets 42, 44. The isolator 88 may represent any of the isolators 46A-46G shown in FIG. 2. Hence, the discussion of the isolator 88 equally applies to all the isolators (visible or not visible in FIG. 2) that may be used in the heat exchanger 36 according to the teachings of the present disclosure. The isolator 88 may include a flexible I-shaped material 90 molded around a threaded insert 92, and may be used to connect the heat exchanger tanks 20, 22 to the sidebrackets 42, 44 as illustrated in FIG. 2. The I-shaped material may be a metal, a plastic (such as Nylon 6/6), or an elastomer (such as EPDM (ethylene propylene diene monomer) or versatile thermoplastic vultanizate (for example, the vulcanizate marketed by Exxon Mobil® as Santoprene™ 101-64)). The threaded insert 92 may be a metallic bolt (e.g., a steel bolt) or a bolt made of harder plastic, for example. The sidebracket mount 88 fits into a corresponding T-shaped indentation (i.e., indentations 32A, 32B, 32D, and 32E illustrated in FIGS. 8A-8D, 9A, and 9B) in a cast tank 20, 22 so as to allow a nut (e.g., any of the nuts 50A-50G shown in FIG. 2) to be attached to the threaded insert 92 (which may appear via a corresponding hole (e.g., any of the holes 48A-48G) in the sidebracket 42, 44 as shown in FIG. 2) to attach the sidebracket 42, 44 to the cast tank 20, 22. This isolator-based sidebracket joint enables the use of stronger (and less expensive) steel sidebrackets 42, 44 without requiring additional machining, welding, or brazing operations, and without having two dissimilar metals (steel of the sidebracket 42, 44 and aluminum of the cast tank 20, 22 and its weldment 10) contact with each other. Furthermore, the flexible sidebracket mount 88 allows for thermal expansion of the core (e.g., the core 11 in FIG. 2) and provides vibration isolation and damping during operating conditions.

From the front view in FIG. 11A, it is noted that, in one embodiment, the height ("IH") of the isolator 88 is approximately 28 mm (1.1 inches), the length or width ("IW") of the isolator 88 (including the threaded portion 92) is approximately 36 mm (1.4 inches). From the side view in FIG. 11B, it is noted that the depth or thickness ("ID") of the I-shaped material 90 is approximately 20 mm (0.8 inch).

It is noted here that the foregoing discussion provides details of an exemplary embodiment in which the substantially I-shaped isolators 88 may suitably fit in the corresponding approximately T-shaped indentations (e.g., indentations 32A, 32B, 32C, etc. shown in FIG. 2) in a cast tank 20, 22. However, in an alternative embodiment, cast tanks 20, 22 may have indentations of a different shape (e.g., indentations that are substantially I-shaped, L-shaped, etc.), and the corresponding isolators (or sidebracket mounts) may be suitably configured to fit into these indentations. For example, in certain embodiments, isolators may be substantially U-shaped to fit into substantially L-shaped indentations.

In various embodiments, the heat exchanger (e.g., the heat exchanger 36) may include one or more isolators. In those embodiments, each isolator may be shaped to be at least partially disposed in one or more indentations, such as one isolator engaging two or more indentations. For example, the isolator may be shaped with two protrusions that each fit into a different of two indentations a tank having at least two indentations; and one or more isolators engaging the at least two indentations, each isolator having a base at least partially disposed in one of the indentations and a coupler extending from the base for coupling the tank to at least one other component of the heat exchanger.

Such isolators may be constructed in a manner similar to the construction of the substantially I-shaped isolators discussed hereinabove. Hence, additional details of different configurations of indentations and corresponding matching isolators are not provided herein for the sake of brevity.

FIGS. 12A and 12B depict front and top views of a sidebracket (e.g., the sidebracket 42) according to one embodiment of the present disclosure. The corner holes 48B-48E of the sidebracket 42 are visible in FIG. 12B. As noted before, the sidebracket 42 may be made of steel to impart strength to the heat exchanger 36 (shown in FIG. 2). In one embodiment, the length ("SL") of the sidebracket 42 is approximately 480 mm (18.9 inches), the height or depth ("SH") of the sidebracket 42 is approximately 30 mm (1.2 inches), and the width ("SW") of the sidebracket 42 is approximately 91 mm (3.6 inches). Additional constructional details of the sidebracket 42 are not relevant to the present discussion and, hence, are not provided herein.

FIGS. 13-15 illustrate various dimensional details for various components of the heat exchanger 36 shown in FIG. 2 according to one embodiment of the present disclosure. For the sake of simplicity and to avoid repetition, all the parts in FIGS. 13-15 are not identified in view of their detailed identifications in FIGS. 1-12 discussed hereinbefore.

FIG. 13A shows a front view and FIG. 13B shows a side view of the fully-assembled core 11 (whose components are depicted in FIG. 4). With respect to FIGS. 13A-13B, in one embodiment, the length ("CL") of the core 11 (including side panels 15-16) is 457 mm (18 inches), the height ("CH") of the core 11 (measured as the distance between the tops of fluid-carrying tubes 12) is 395 mm (15.6 inches), and the width or depth ("CW") of the core 11 (which may be the same or close to the same as the width of the headers 18-19) is 76 mm (3 inches).

FIG. 14A shows a front view and FIG. 14B shows a side view of the assembled weldment 10 (whose unassembled view is provided in FIG. 1). With respect to FIGS. 14A-14B, in one embodiment, the length ("WL") of the weldment 10 (which length may be the same as the length of each cast tank 20, 22) is approximately 457 mm (18 inches), the height ("WH") of the weldment 10 (measured as the distance between the top of the fillneck 30 and the bottom of the mount 34A or 34B) is approximately 550 mm (21.7 inches), and the width or depth ("WD") of the weldment 10 (measured as the distance between the top of the connector 26A or 26B and the distant, opposite end of a shorter side panel of the respective cast tank 20 or 22) is approximately 121 mm (4.8 inches).

Figures 15A, 15B:
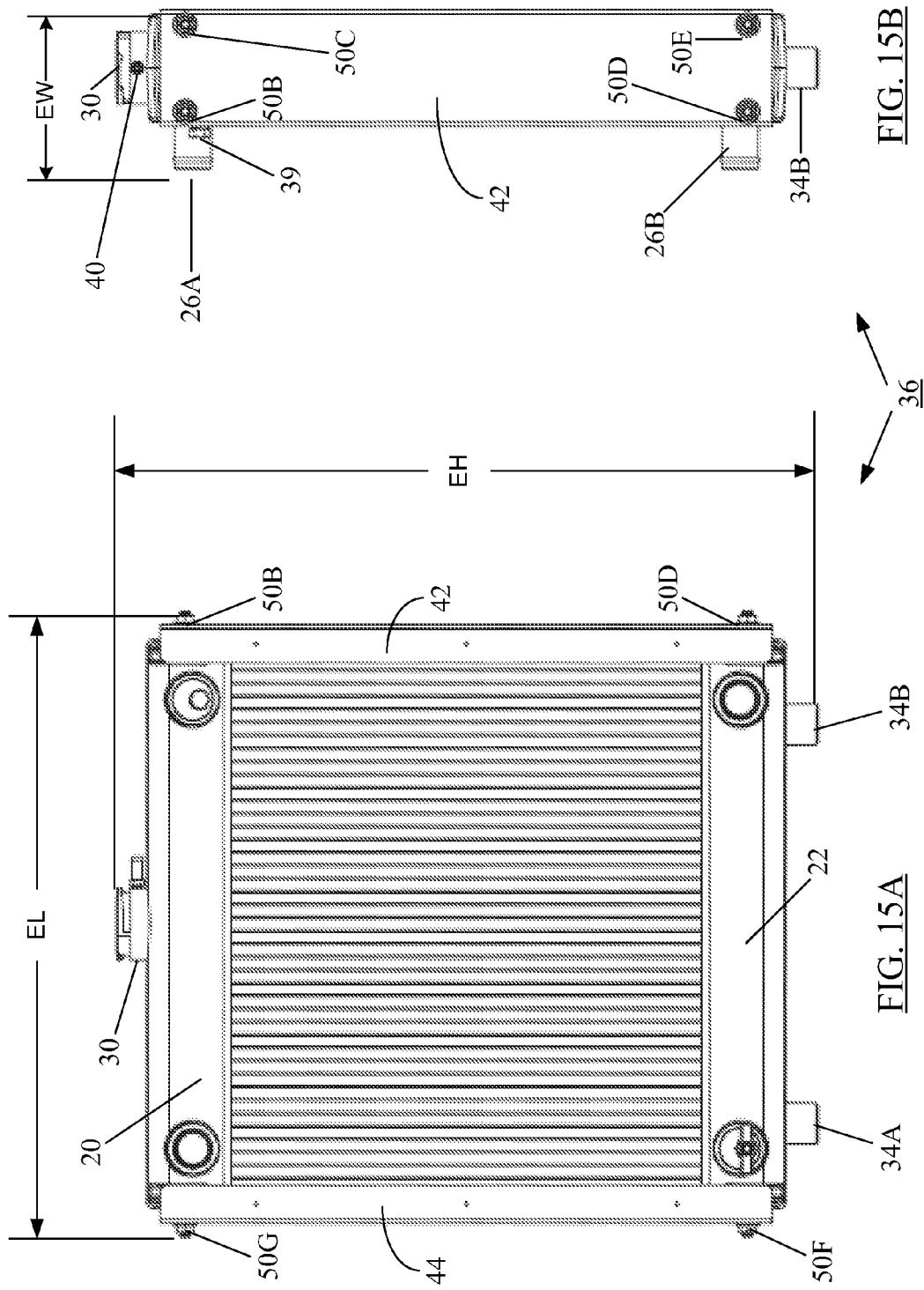
FIG. 15A illustrates a front view of another embodiment of a radiator.
FIG. 15B illustrates an end view of the embodiment of the radiator illustrated in FIG. 15A.

FIG. 15A shows a front view and FIG. 15B shows a side view of the assembled heat exchanger 36 (whose unassembled view is provided in FIG. 2). With respect to FIGS. 15A-15B, in one embodiment, the length ("EL") of the heat exchanger 36 (measured as an end-to-end distance between the sidebracket nuts 50G and 50B or 50F and 50D) is approximately 488 mm (19.2 inches), the height ("EH") of the heat exchanger 36 (which height is the same as the height of the weldment 10 in FIG. 14A) is approximately 550 mm (21.7 inches), and the width or depth ("EW") of the heat exchanger 36 (measured as the distance between the top of the connector 26A or 26B and the opposite, distant end of the respective sidebracket 42 or 44) is approximately 124 mm (4.9 inches).

Another embodiment is a method of attaching a header to a tank. As described herein, the tank may be cast, such as out of aluminum, or molded, such as out of plastic. This embodiment is discussed below with respect to header 18 and tank 20, though the method may similarly apply to header 19 and tank 22. Referring to FIGS. 1 and 10, the method includes forming the tank 20 with a top panel 21A and a side 21B-21E having an inner surface 76A-76B, the side 21B-21E extending from the top panel 21A and terminating in a rim 23 such that a dimension from the top panel 21A to the rim 23 is consistent and a dimension along the rim 23 is consistent. The dimension from the top panel 21A to (any part of) the rim 23 may be the distance, from the perspective of FIG. 10, from a point on the top panel 21A to the rim 23 in the direction perpendicular to an imaginary line connecting the rim 23 between opposing side panels (e.g. 21C and 21D, or 21B and 21E as shown in FIG. 8A) of the tank 20. That dimension may be consistent, and thus approximately the same along the entire rim 23.

The dimension along the rim 23, as introduced above, may be a consistent distance between opposing sides (i.e., distance between longer side panels 21B and 21E, and distance between shorter side panels 21C and 21D).

In an embodiment, the aforementioned consistent dimensions (i.e. dimension from the top panel 21A to the rim 23 and the dimension along the rim 23) and location of the rim 23 are maintained within a tight tolerance that may not be achievable using sheet goods.

The header 18 may be formed with a base portion 68 and a drafted wall 72 extending from the base portion 68. The header 18 may be moved or slid within the tank 20 such that the drafted wall 72 moves adjacent to or slides along the inner surface 76A-76B of the side 21B-21E of the tank 20. Because of the outwardly slanted inner surface 76A-76B of the side 21B-21E of the tank 20 and outwardly slanted outer surface of the drafted wall 72 of the header 18, the drafted wall 72 may, in an embodiment, remain in contact or nearly in contact with the inner surface 76B near the rim 23 as the drafted wall 72 moves or slides within the tank 20. Thus, at different of those moved distances, the header 18 may still be welded to the tank 20 along the rim 23. This enables a fixed distance between each tank-to-header joint to be maintained. This fixed distance facilitates robotic welding, since the robotic welder can be programmed to automatically weld the header 18 and tank 20 together along the consistent, and thus known, dimension.

In an embodiment, the drafted wall 72 of the header 18 remains in contact or nearly in contact with inner surface 76A-76B of the side 21B-21E of the tank 20 near the rim 23 as the drafted wall 72 slides within the tank 20 because, at least in part, the outer surface of the drafted wall 72 is outwardly slanted. In another embodiment, the drafted wall 72 of the header 18 remains in contact or nearly in contact with the inner surface 76A-76B of the side 21B-21E of the tank 20 near the rim 23 as the drafted wall 72 slides within the tank 20 because, at least in part, both the outer surface of the drafted wall 72 and the inner surface 76A-76B of the side 21B-21D of the tank 20 are outwardly slanted.

In an embodiment, the drafted wall 72 is adjacent to or slides along the inner surface 76B of the side 21B-21D of the tank 20. Thus, a gap may exist between the drafted wall 72 and the tank 20 having a width not more than could be filled by a welding bead, or the drafted wall 72 may contact the tank 20 or slide along the inner surface 76B of the side 21B-21D of the tank 20. For example, in one embodiment, the drafted wall 72 may slide along the inner surface 76B of the side 21B-21D of the tank 20, thus overlapping the tank 20 up to one inch.

The foregoing embodiments describe an aluminum (or aluminum alloy) industrial heat exchanger (or radiator) that provides consistency in tank-to-header joint locations to allow use of robotic welding of tanks to headers. A header design that includes the combination of a curved fillet and a drafted wall facilitates easy insertion of the radiator tank onto the core of the radiator and allows for a degree of unpredictable core growth during baking of the core. The tanks are made by casting in such a manner that machining is not required. The inner surface of the aluminum cast tank is welded onto the header and is configured to match the geometry of the drafted wall of the header. Each cast tank of the radiator includes suitably-shaped indentations (e.g., approximately sideways T-shaped indentations) at the four corners of the cast tank to facilitate linking of the cast tanks to (frequently stronger and less expensive) steel sidebrackets using sidebracket mounts (or isolators) that may be made of a flexible material molded around a threaded insert. Sidebrackets may furthermore be captured by attaching nuts to the threaded inserts of the sidebracket mounts, without requiring any machining or welding/brazing operations. The sidebracket mounts or isolators thus allow for flexible mounting of sidebrackets, and allow for thermal expansion of the core. As mentioned before, various dimensional details provided herein are exemplary in nature, and can be modified as needed without departing from the scope of the teachings in the present disclosure. Also, although certain discussion herein focuses on an industrial heat exchanger for internal combustion engines, the radiator design principles discussed herein may be used to design similar heat exchangers for use in other applications, including, for example, heat exchangers used in automotives, refrigeration, hydraulic oil coolers, etc.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A tank to be used as part of a heat exchanger, said tank comprising:
    an elongate housing having a substantially U-shaped cross section, wherein said elongate housing includes:
    a pair of longer side panels, wherein each longer side panel has a first outer surface and a first inner surface;
    a top panel;
    a pair of shorter side panels, wherein each shorter side panel has a second outer surface and a second inner surface;
    and four indentations, each indentation in at least one of said pair of longer side panels, said top panel, and said pair of shorter side panels, and each indentation in a different one of four corners of said top panel.

2. The tank of claim 1, wherein the elongate housing is formed of cast aluminum.

3. The tank of claim 1, wherein the elongate housing is formed of molded plastic.

4. The tank of claim 1, wherein each said indentation is identically shaped.

5. The tank of claim 1, wherein each said indentation is one of the following:
    an approximately T-shaped indentation;
    an approximately I-shaped indentation; and
    an approximately L-shaped indentation.

6. The tank of claim 1, wherein each said first inner surface and each said second inner surface is outwardly slanted from perpendicular to a plane in which said top panel generally lies.

7. The tank of claim 1, wherein said housing further includes:
a pair of holes formed in a spaced-apart manner on one of said pair of longer side panels.

8. The tank of claim 7, wherein said pair of holes and each said indentation are formed in said housing along with said pair of longer side panels, said top panel, and said pair of shorter side panels, thereby forming a unitary structure for said tank.

9. The tank of claim 8, wherein portions of each said first inner surface and each said second inner surface are configured to be mounted on a header of a core in said heat exchanger so as to enable welding of said tank onto said core.

10. The tank of claim 1, wherein each indentation is to receive an isolator at least partially therein.

11. The tank of claim 10, each isolator comprising a coupler, wherein each coupler is to fasten the tank to a side-bracket.

12. The tank of claim 10, wherein each coupler is a threaded insert.

* * * * *